(12) United States Patent
Iorga

(10) Patent No.: US 11,772,780 B2
(45) Date of Patent: Oct. 3, 2023

(54) AEROFOIL STRUCTURES WITH STIFFNESS PROPERTIES ADJUSTMENT COMPONENT

(71) Applicant: Airbus Operations Limited, Bristol (GB)

(72) Inventor: Nicolae Lucian Iorga, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 17/709,896

(22) Filed: Mar. 31, 2022

(65) Prior Publication Data
US 2022/0340266 A1    Oct. 27, 2022

(30) Foreign Application Priority Data

Apr. 22, 2021   (GB) ..................................... 2105737

(51) Int. Cl.
*B64C 23/06* (2006.01)
*B64C 3/18* (2006.01)

(52) U.S. Cl.
CPC ............ *B64C 23/072* (2017.05); *B64C 3/185* (2013.01)

(58) Field of Classification Search
CPC .. B64C 5/08; B64C 3/185; B64C 3/18; B64C 3/58; B64C 3/187; B64C 23/069; B64C 23/072; B64F 5/10
See application file for complete search history.

(56) References Cited

U.S. PATENT DOCUMENTS

| 2,311,683 | A | * | 2/1943 | Naugle | ..................... B64C 3/22 244/123.7 |
| 6,638,466 | B1 | | 10/2003 | Abbott | |
| 8,387,913 | B2 | * | 3/2013 | Karem | ..................... B64C 3/56 244/54 |
| 2012/0132751 | A1 | * | 5/2012 | Groves | ..................... B64C 3/22 29/428 |

(Continued)

FOREIGN PATENT DOCUMENTS

| EP | 3415415 A1 * | 12/2018 | ........... B64C 23/069 |
| EP | 3415415 A1 | 12/2018 | |

(Continued)

OTHER PUBLICATIONS

British Search Report for Application No. 2105737 dated Jan. 5, 2022.

*Primary Examiner* — Tien Q Dinh
*Assistant Examiner* — Katherine June Bolek
(74) *Attorney, Agent, or Firm* — KDW Firm PLLC

(57) ABSTRACT

An airfoil structure for an aircraft includes a spanwise-extending load-carrying member, a leading-edge structure, a trailing-edge structure, an upper cover, and a lower cover. The load-carrying member is configured to react more than half of all flight loads experienced by the airfoil structure during flight and is configured to have selected stiffness properties selected such that the airfoil structure bends and twists in a predefined manner in response to applied flight loads. The leading-edge structure is configured to form a leading-edge part of an aerodynamic surface of the airfoil structure. The trailing-edge structure is configured to form a trailing edge part of the aerodynamic surface. The upper cover is configured to form an upper part of the aerodynamic surface. The lower cover is configured to form a lower part of the aerodynamic surface.

20 Claims, 5 Drawing Sheets

(56) References Cited

U.S. PATENT DOCUMENTS

2015/0203187 A1\* 7/2015 Johnson ............... B64C 3/34
                                                  244/123.7
2018/0057142 A1\* 3/2018 Wilkerson ............ B64C 3/26

FOREIGN PATENT DOCUMENTS

| EP | 3476719 A1 | 5/2019 | |
|----|----|----|----|
| GB | 447459 A \* | 8/1934 | ............ B64C 3/00 |
| GB | 447459 A1 | 5/1936 | |
| GB | 450729 A | 7/1936 | |
| WO | WO 2013/030527 A1 | 3/2013 | |
| WO | WO-2013030527 A1 \* | 3/2013 | ............ B29C 73/10 |
| WO | WO 2015/084435 A1 | 6/2015 | |

\* cited by examiner

AEROFOIL STRUCTURES WITH STIFFNESS PROPERTIES ADJUSTMENT COMPONENT

CROSS-REFERENCE TO RELATED APPLICATION

This application claims priority to GB 2105737.7 filed Apr. 22, 2021, the entire disclosure of which is incorporated by reference herein.

TECHNICAL FIELD

The disclosure herein relates to an aerofoil ("airfoil" as used herein) structure for an aircraft, to an aircraft comprising an airfoil structure, to a method of manufacturing an airfoil structure, and to a method of adjusting the bending and twisting behavior of an aircraft airfoil structure.

BACKGROUND

Aeroelastic tailoring is the optimization of the interrelationship between aerodynamic loads and structural deflections of a wing. Aeroelastic tailoring can enable lighter, higher performance and more efficient wing structure designs. The bending stiffness, torsion stiffness, and bending-torsion coupling stiffness along the span of a wing can all be optimized to improve both the static and dynamic behavior of the wing. For example, the tailoring can be configured to reduce the effects of wind gusts on the wing, by causing the local angle of attack of the wing airfoil to reduce in response to upwards spanwise bending of the wing. This reduces the load on the wing, enabling it to have a lighter structure. Alternatively or additionally, the tailoring can be configured to achieve optimal wing deflections for other performance-improving outcomes, such as reducing drag or improving aileron control effectiveness.

For wings made of composite materials, aeroelastic tailoring can be achieved through the choice of particular fiber orientations, together with appropriate volume fractions for each orientation. However; only limited aeroelastic tailoring is possible when using isotropic materials such as aluminum. For conventional wing structures made from such isotropic materials, the only way to alter the aeroelastic properties is to vary the position and orientation of the spars and the stringers, which is only feasible to a very limited degree.

SUMMARY

A first aspect of the disclosure herein provides an airfoil structure for an aircraft. The airfoil structure comprises a spanwise-extending load-carrying member, a leading-edge structure, a trailing-edge structure, an upper cover, and a lower cover. The load-carrying member is configured to react more than half of all flight loads experienced by the airfoil structure during flight and is configured to have selected stiffness properties selected such that the airfoil structure bends and twists in a predefined manner in response to applied flight loads. The leading-edge structure is configured to form a leading-edge part of an aerodynamic surface of the airfoil structure and is fixedly mounted to the load-carrying member. The trailing-edge structure is configured to form a trailing edge part of the aerodynamic surface and is fixedly mounted to the load-carrying member. The upper cover is configured to form an upper part of the aerodynamic surface and is mounted to the load-carrying member. The lower cover is configured to form a lower part of the aerodynamic surface and is mounted to the load-carrying member.

Optionally, the load-carrying member is unitary.

Optionally, the stiffness properties of the load-carrying member are selected such that the leading-edge of the airfoil structure moves downwardly by a predetermined amount in response to an outboard end of the airfoil structure moving upwardly relative to an inboard end of the airfoil structure by a particular amount.

Optionally, one or both of the leading-edge structure and the trailing-edge structure is modular.

Optionally, at least one parameter relating to a cross-sectional shape of the load-carrying member varies along the span of the load-carrying member, and/or at least one parameter relating to the material properties of the load-carrying member varies along the span of the load-carrying member.

Optionally, an adjustment component is fixedly attached to the load-carrying member at a selected location, and the adjustment component is configured to alter the stiffness properties of the load-carrying member such that the airfoil structure bends and twists in a different predefined manner in response to applied flight loads compared to if no adjustment components were attached to the load-carrying member.

Optionally, the adjustment component is configured to alter the cross-sectional shape of the load-carrying member at the selected location. Optionally, the adjustment component is configured to alter the material properties of the load-carrying member at the selected location.

Optionally, the stiffness properties of the load-carrying member are selected in dependence on factors relating to the intended operation of an aircraft in which the airfoil structure is intended to be comprised.

Optionally, the lower cover is removably mounted to the load-carrying member.

Optionally, the airfoil structure comprises an outboard part of a high aspect ratio aircraft wing.

Optionally, the airfoil structure is comprised in a moveable part of a folding aircraft wing.

A second aspect of the disclosure herein provides an aircraft comprising an airfoil structure according to the first aspect.

A third aspect of the disclosure herein provides a method of manufacturing an aircraft airfoil structure which bends and twists in a predefined manner in response to applied flight loads. The method comprises:

providing a load-carrying member which is configured to react substantially all flight loads expected to be experienced by the airfoil structure during flight, wherein the load-carrying member is configured to have selected stiffness properties selected such that the resulting airfoil structure bends and twists in a predefined manner in response to applied flight loads;

fixedly attaching a leading-edge structure configured to form a leading-edge part of an aerodynamic surface of the airfoil structure to the load-carrying member;

fixedly attaching a trailing-edge structure configured to form a trailing edge part of the aerodynamic surface to the load-carrying member;

mounting an upper cover configured to form an upper part of the aerodynamic surface to the load-carrying member; and mounting a lower cover configured to form a lower part of the aerodynamic surface to the load-carrying member.

Optionally, the method further comprises altering the stiffness properties of the load-carrying member in a predetermined manner by fixedly attaching an adjustment component to the load-carrying member at a selected location on the load-carrying member.

Optionally, performance of the method results in the formation of an airfoil structure according to the first aspect.

A fourth aspect of the disclosure herein provides a method of adjusting the bending and twisting behavior of an aircraft airfoil structure. The method comprises:
   providing an airfoil structure according to the first aspect;
   removing the lower cover from the airfoil structure;
   altering stiffness properties of the load-carrying member in a predetermined manner;
   replacing the lower cover on the airfoil structure.

Optionally, altering stiffness properties of the load-carrying member in a predetermined manner comprises fixedly attaching an adjustment component to the load-carrying member at a selected location.

BRIEF DESCRIPTION OF THE DRAWINGS

Embodiments of the disclosure herein will now be described, by way of example only, with reference to the accompanying drawings, in which.

DETAILED DESCRIPTION

Figure 1A:
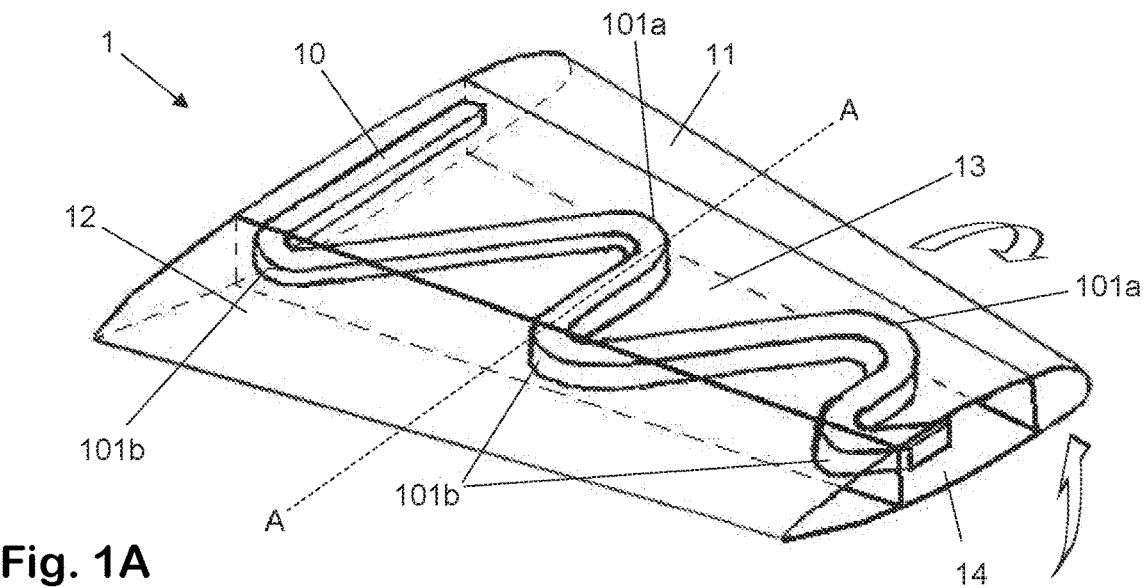
FIG. 1A is a perspective view of a first example airfoil structure according to the disclosure herein.

Various examples of the disclosure herein will now be described. Each example relates to an airfoil structure for an aircraft. In each example the airfoil structure comprises a spanwise-extending load-carrying member, a leading-edge structure, a trailing-edge structure, an upper cover and a lower cover. The load-carrying member is configured to react substantially all flight loads experienced by the airfoil structure during flight and is configured to have selected stiffness properties which are selected such that the airfoil structure bends and twists in a predefined manner in response to applied flight loads. The leading-edge structure is configured to form a leading-edge part of an aerodynamic surface of the airfoil structure, and is fixedly mounted to the load-carrying member. The trailing-edge structure is configured to form a trailing edge part of the aerodynamic surface and is fixedly mounted to the load-carrying member. The upper cover is configured to form an upper part of the aerodynamic surface and is mounted to the load-carrying member. The lower cover is configured to form a lower part of the aerodynamic surface and is mounted to the load-carrying member.

The configuration of the load-carrying member is designed to produce predetermined bending, twisting and bend-twist coupling characteristics which are beneficial for a particular intended application of the wing. Because the load-carrying member is configured to react substantially all of the flight loads, the rest of the structural members (the leading-edge structure, the trailing-edge structure, the upper cover and lower cover) provide a much smaller contribution to the overall stiffness of the airfoil structure. This means that the stiffness properties of the airfoil structure can be significantly altered just by changing the configuration of the load-carrying member—the other structural members may be left unchanged.

Example airfoil structures according to the disclosure herein therefore advantageously enable the possibility of aircraft wings which are tailored to meet the needs of a specific customer. In particular, airfoil structures according to the disclosure herein enable the aeroelastic properties of a wing to be customized to best suit a particular intended use of a particular aircraft in which that wing is to be comprised. Such customizability is not possible for conventional aircraft airfoil structures comprising a closed thin-wall beam formed by the spars and covers (a "wing box"). Such a box structure is inherently stiff in torsion, significantly limiting the effective achievable twist due to structural bend-twist coupling. Furthermore, the nature of the wing box construction means that it is not feasible to adjust the stiffness properties of the wing either in service or during the manufacturing stage. Thus, the performance of a conventional wing box-based aircraft wing is fixed for an entire variant or sub-variant of the aircraft.

Various other benefits may be provided by example airfoil structures according to the disclosure herein, as will be explained in the following description of specific examples.

Figure 1B:
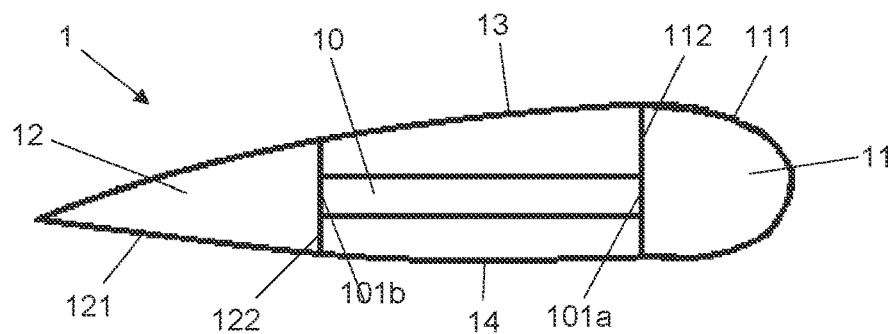
FIG. 1B is a cross-section through the example airfoil structure of FIG. 1A.

FIGS. 1A and 1B show a first example airfoil structure 1 according to the disclosure herein. FIG. 1A is a perspective view of the airfoil structure 1 and FIG. 1B is a cross-section through the airfoil structure 10 taken along the line A-A.

The airfoil structure 1 is configured to form part of an aircraft. The airfoil structure 1 may, for example, be configured to be comprised in an aircraft wing. Alternatively, the airfoil structure 1 may be configured to be comprised in a horizontal tailplane, a vertical tailplane, a helicopter rotor blade, or any other airfoil structure which is configured to form part of an aircraft. In some examples the airfoil structure 1 is configured to form part of a commercial airliner. In the particular illustrated example, the airfoil structure 1 is configured to form an outboard part of a wing of a commercial airliner.

The airfoil structure 1 comprises a spanwise-extending load-carrying member 10. The load-carrying member 10 is configured to react substantially all flight loads experienced by the airfoil structure 1 during flight of an aircraft in which the airfoil structure 1 is comprised. A leading-edge structure 11 is mounted to a leading-edge side (with respect to an intended operational orientation of the airfoil structure 1) of the load-carrying member 10 and a trailing edge-structure 12 is mounted to a trailing-edge side of the load-carrying member 10. An upper cover 13 is mounted to an upper side of the load-carrying member 10 and a lower cover 14 is mounted to a lower side of the load-carrying member 10. In FIG. 1 the leading-edge structure 11, trailing-edge structure 12, upper cover 13 and lower cover 14 are all depicted as transparent so that the load-carrying member 10 is visible.

The loads experienced by an aircraft wing during flight ("flight loads") are the sum of the aerodynamic lift and drag forces, as well as concentrated and distributed weight of wing-mounted engines, wing-mounted systems, stored fuel and structural elements. Conventional commercial airliner wings have a semi-monocoque construction in which a thin outer skin is supported by an inner framework, which typically includes longitudinal stiffening spars and stringers and transverse ribs. In such conventional wings the upper and lower skins (covers) support the aerodynamic pressure distribution and transmit these aerodynamic forces to the inner framework. The ribs resist the aerodynamic pressure loads and support the covers to maintain the airfoil cross-sectional shape. The covers and the webs of the spars act together to resist the shear and torsional loads; and the covers, spar flanges and stringers act together to resist the axial and bending loads.

By contrast, in the airfoil structure 1 (and in all airfoil structures according to the disclosure herein) more than half of all flight loads are reacted by the spanwise-extending load-carrying member 10. It may be the case that most of the flight loads are reacted by the spanwise-extending load-carrying member 10. The other structural members of the airfoil structures according to the disclosure herein (leading-edge structure, trailing-edge structure, upper cover and lower cover) define the cross-sectional shape of the airfoil structure but react only a relatively small amount of load during operation of the airfoil structure on an aircraft compared with the load reacted by the load-carrying member, and also compared with the load reacted by equivalent structural members of a conventional semi-monoque airfoil. For example, spanwise-extending longitudinal structural elements of the leading-edge structure will, in airfoil structures according to the disclosure herein, react a proportion of the bending moment, but this proportion will not be more than 10%. In general, the other structural members of airfoil structures according to the disclosure herein (that is, other than the load-carrying member) in combination will react not more than 20% of the torsional flight loads and not more than 10% of the shear flight loads. The load-carrying member may therefore react at least 80% of the torsional flight loads and at least 90% of the shear flight loads. In some examples the load-carrying member 10 is configured to react substantially all flight loads and the other structural members of the airfoil structure 1 do not react a significant amount of load during operation of the airfoil structure 1 on an aircraft.

The leading-edge structure 11 is configured to form a leading-edge part of an aerodynamic surface of the airfoil structure 1. The leading-edge structure 11 comprises a curved outer surface 111 which is configured to form a leading-edge region of the outer surface of the airfoil structure 1. The leading-edge structure 11 further comprises a substantially vertical web part 112, which connects the upper trailing edge of the outer surface 111 to the lower trailing edge of the outer surface 111. The leading-edge structure defines the aerodynamic shape of the leading-edge part of the airfoil structure 1 and also functions as a housing for any systems (for example, mechanical, hydraulic, pneumatic, and/or electrical systems) that it may be necessary or desirable to provide in the leading-edge part of the airfoil structure 1.

The leading-edge structure 11 may be a modular leading-edge structure. A "modular leading-edge structure" is a leading-edge structure which is provided as a preassembled structural module that can be handled as a unitary component during construction of the airfoil structure 1. The leading-edge structure 11 may be pre-equipped with the systems mentioned above, including actuation elements for any leading-edge moveable devices which are to be mounted on the airfoil structure 1. Such a moveable device may be, for example, a slat, a Krueger flap, or the like. Apart from features relating to the interface of the leading-edge structure 11 with the load-carrying member 10, the design and construction of the leading-edge structure 11 may be substantially similar to that of a leading-edge structure for a conventional semi-monocoque aircraft wing.

The web part 112 of the leading-edge structure 11 is configured to be fixedly attached to the load-carrying member 10. The term "fixedly attached" is intended to mean that the attachment mechanism permits substantially no relative movement between the attached components, such that substantially all loads experienced by one of the components will be transmitted to the other component via the attachment mechanism. The web part 112 may comprise mounting features such as fastener holes, lugs, brackets or the like at selected attachment locations to facilitate fixedly attaching the leading-edge structure 11 to the load-carrying member 10. The locations of any such mounting features correspond to the locations of forward corner regions 101*a* of the load-carrying member 10 when the load-carrying member 10 and the leading-structure 11 are arranged adjacent each other in their intended operational positions. The load-carrying member 10 may comprise corresponding mounting features on each of the forward corner regions 101*a*, such mounting features being configured to engage with the mounting features of the leading-edge structure 11. Suitable attachment mechanisms for fixedly attaching the leading-edge structure 11 to the forward corner regions 101*a* include nut-and-bolt type fasteners; blind fasteners; rivets; and the like. The attachment mechanisms attaching the leading-edge structure 11 to the load-carrying member 10 are not shown in FIGS. 1A-1B.

The trailing-edge structure 12 is configured to form a trailing-edge part of the aerodynamic surface of the airfoil structure 1. The trailing-edge structure 12 comprises an outer surface 121 which is configured to form a trailing-edge region of the outer surface of the airfoil structure 1. The trailing-edge structure 12 further comprises a substantially vertical web part 122, which connects the upper leading edge of the outer surface 121 to the lower leading edge of the outer surface 121. The trailing-edge structure 12 defines the aerodynamic shape of the trailing-edge part of the airfoil structure 1 and also functions as a housing for any systems (for example, mechanical, hydraulic, pneumatic, and/or electrical systems) that it may be necessary or desirable to provide in the trailing edge part of the airfoil structure 1, depending on the particular design and intended application of the airfoil structure 1.

The trailing-edge structure 12 may be a modular trailing-edge structure, which is provided as a preassembled structural module. The trailing-edge structure 12 may be pre-equipped with the systems mentioned above, including actuation elements for any trailing-edge moveable devices which are to be mounted on the airfoil structure 1. Such a moveable device may be, for example, a flap, an aileron, a spoiler, or the like. Apart from features relating to the interface of the trailing-edge structure 12 with the load-carrying member 10, the design and construction of the trailing-edge structure 12 may be substantially similar to that of a trailing-edge structure for a conventional semi-monocoque aircraft wing.

The web part 122 of the trailing-edge structure 12 is configured to be fixedly attached to the load-carrying member 10. The web part 122 may comprise mounting features such as fastener holes, lugs, brackets or the like at selected attachment locations to facilitate fixedly attaching the trailing-edge structure 12 to the load-carrying member 10. The locations of any such mounting features correspond to the locations of rearward corner regions 101*b* of the load-carrying member 10 when the load-carrying member 10 and the trailing-edge structure 12 are arranged relative to each other in their intended operational positions. The load-carrying member 10 may comprise corresponding mounting features on each of the rearward corner regions 101*b*, such mounting features being configured to engage with the mounting features of the trailing-edge structure 12. Suitable attachment mechanisms for fixedly attaching the trailing-edge structure 12 to the rearward corner regions 101*b* include nut-and-bolt type fasteners; blind fasteners; rivets; and the like. The trailing-edge structure 12 may be (but need not be) configured to be attached to the load-carrying member 10 by the same type of attachment mechanisms as the leading-edge structure 11. The attachment mechanisms attaching the trailing-edge structure 12 to the load-carrying member 10 are not show in FIGS. 1A-1B.

The upper cover 13 is configured to form an upper part of the aerodynamic surface of the airfoil structure 1. The upper cover 13 comprises a skin panel which may be substantially similar in its design and construction to a skin panel for a conventional semi-monocoque aircraft wing. However; since the upper cover 13 of an airfoil structure according to the disclosure herein is not required to react any significant amount of load during operation of the airfoil structure 1 (because the load-carrying member 10 reacts substantially all of the flight loads) it may have a more lightweight construction than an equivalently-sized conventional upper cover panel.

The upper cover 13 is mounted to the load-carrying member in any suitable manner such that the aerodynamic shape of the upper cover 13 is maintained during flight of an aircraft in which the airfoil structure 1 is comprised. For example, brackets or spacer components (which may be similar to conventional aircraft ribs) may extend between an upper surface of the load-carrying member 10 and a lower surface of the upper cover 13 at selected locations. Such brackets/spacer components may be attached to the load-carrying member 10 and the upper cover 13 by any suitable attachment mechanism. The attachments may be fixed, or they may permit some relative movement between the upper cover 13 and the bracket, and/or between the bracket and the load-carrying member 10. No mounting mechanisms for the upper cover 13 are shown in FIGS. 1A-1B.

The lower cover 14 is configured to form a lower part of the aerodynamic surface of the airfoil structure 1. The lower cover 14 comprises a skin panel which may be substantially similar in its design and construction to a skin panel for a conventional semi-monocoque aircraft wing. However; since the lower cover 14 of an airfoil structure according to the disclosure herein is not required to react any significant amount of load during operation of the airfoil structure 1 (because the load-carrying member 10 reacts substantially all of the flight loads) it may have a more lightweight construction than an equivalently-sized conventional lower cover panel.

The lower cover 14 is mounted to the load-carrying member 10 in any suitable manner such that the aerodynamic shape of the lower cover 14 is maintained during flight of an aircraft in which the airfoil structure 1 is comprised. For example, brackets or spacer components may extend between a lower surface of the load-carrying member 10 and an upper surface of the lower cover 14 at selected locations. Such brackets/spacer components may be attached to the load-carrying member 10 and the lower cover 14 by any suitable attachment mechanism. The attachments may be fixed, such that substantially no relative movement between the attached components is permitted. Alternatively, the attachments may permit some relative movement between the lower cover 14 and the bracket, and/or may permit some relative movement between the bracket and the load-carrying member 10. In some examples the attachments between the brackets and the lower cover 14 are removable, to enable in-service removal of the lower cover 14. No mounting mechanisms for the lower cover 14 are shown in FIGS. 1A-1B.

Figure 2A:
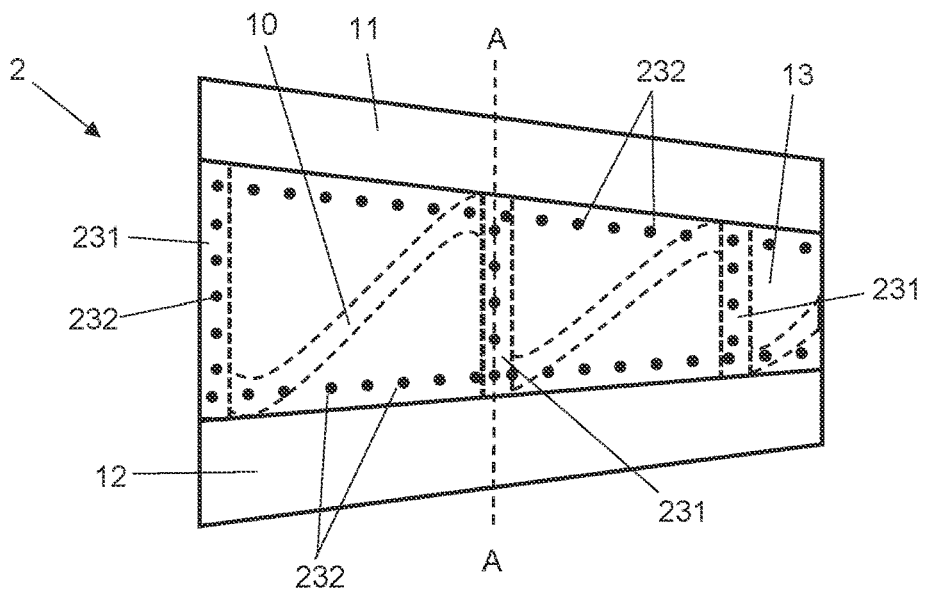
FIG. 2A is a plan view of a second example airfoil structure according to the disclosure herein.
Figure 2B:
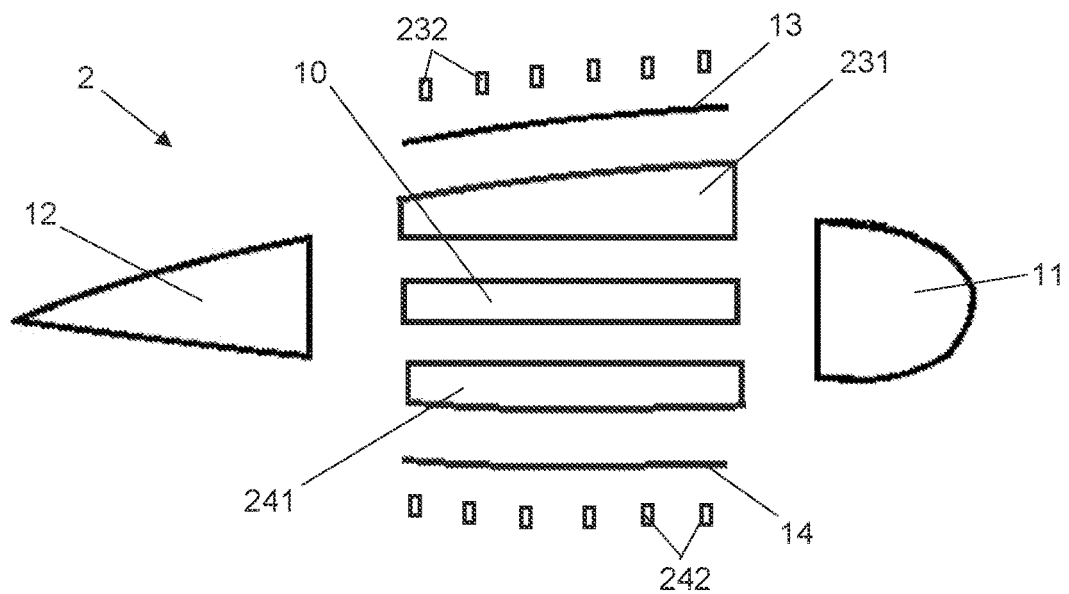
FIG. 2B is an exploded cross-section through the example airfoil structure of FIG. 2A.

FIGS. 2A and 2B show a particular example airfoil structure 2 in which the upper cover 13 is mounted to the load-carrying member 10 by a first set of support structures 231 and a first set of fasteners 232 and the lower cover 14 is mounted to the load-carrying member 10 by a second set of support structures 241 and a second set of fasteners 242. FIG. 2A is a plan view of an upper surface of the airfoil structure 1 and FIG. 2B is an exploded cross-section taken along the line A-A in FIG. 2A. The load-carrying member, upper and lower covers, leading-edge structure and trailing-edge structure of the example airfoil structure 2 are substantially identical to the corresponding components of the example airfoil structure 1 and have therefore been denoted using the same reference numbers.

The load-carrying member 10 comprises three sections which extend along a substantially chordwise direction. On each substantially chordwise section of the load-carrying member 10 there is mounted an upper support member 231 and a lower support member 241. Each upper support member 231 is fixedly attached to an upper surface of the load-carrying member 10 using any suitable attachment mechanism (such as one or more fasteners). Each lower support member 241 is fixedly attached to a lower surface of the load-carrying member 10 using any suitable attachment mechanism. Each upper and lower support member 231, 241 has a substantially vertical, substantially planar web part. Although in the illustrated example the web part comprises a continuous sheet of material, in other examples it may comprise one or more openings, and/or may be provided in the form of one or more trusses.

Each support member comprises one or more flanges or similar features at the upper and lower edges of the web part to facilitate attaching the support member to the load-carrying member 10 and to the upper cover 13 or lower cover 14. Although in the example of FIGS. 2A-2B the upper support members 241 are separate components from the lower support members 231, in other examples each pair of co-located (relative to a spanwise direction of the airfoil structure 1) upper and lower support members 231, 241 may be comprised in a single unitary component, similar to a rib of a conventional aircraft wing.

In the particular illustrated example, each upper support member 231 is substantially planar and is shaped to extend across a planar region between the load-carrying member 10 and the upper cover 13, as can be seen from FIG. 2B. Similarly, each lower support member 241 is substantially planar and is shaped to fill a planar region between the load-carrying member 10 and the lower cover 14. The shape of the support members 231, 241 enables them to support the upper and lower covers 13, 14 in a desired aerodynamic shape during operation of the airfoil structure 1. In other examples the upper and/or lower support members may have any alternative configuration which allows them to carry out this function. For example, the upper and/or lower support members 231, 241 may include one or more openings. Such openings may be desirable for reducing the weight of the support members, and/or for enabling the passage of fluid and/or electrical systems and/or mechanical systems across the support members 231, 241.

The upper support member 231 is attached to the upper cover 13 by a first set of fasteners 232. The fasteners 232 may be of any suitable known type, such as bolts, rivets, blind fasteners or the like. The fasteners 232 extend through the upper cover 13 and through a flange part of the upper support member 231. In some examples the upper cover 13 is fixedly attached to the upper support member 231, in which case the fasteners 232 are configured to prevent substantially all relative movement between the upper cover 13 and the support member 231 and to transmit load between the upper cover 13 and the upper support member 231. In other examples the attachment between the upper cover 13 and the upper support member 231 is not fixed, meaning that at least some relative movement is permitted between the upper cover 13 and the upper support member 231. Such a "non-fixed" attachment may be achieved in any suitable manner, for example through the use of bearings, oversized fastener holes, or any other known mechanism for permitting relative movement between two attached components.

The lower support member 241 is similarly attached to the lower cover 14 by a second set of fasteners 242 of any suitable known type. The fasteners 242 extend through the lower cover 14 and through a flange part of the lower support member 241. In some examples the lower cover 14 is fixedly attached to the lower support member 241, in which case the fasteners 242 are configured to prevent substantially all relative movement between the lower cover 14 and the lower support member 241 and to transmit load between the lower cover 14 and the lower support member 241. In other examples the attachment between the lower cover 14 and the lower support member 241 is not fixed, in the manner described above in relation to the upper support member 231.

In some examples the attachment of the lower cover 14 to the lower support members 241 is configured such that the lower cover 14 is removably mounted to the load-carrying member 10. This may be achieved, for example, by the fasteners 242 being of a type which is easily removable without causing damage to the lower cover 14 or any other component of the airfoil structure 1. Being able to easily remove the lower cover 14 confers various advantages, including ease of access to the load-carrying member 10 during assembly, and also for inspection and maintenance when the airfoil structure 1 is in service.

Returning to the example airfoil structure 1 of FIGS. 1A-1B, the load-carrying member 10 is configured to have selected stiffness properties, which have been selected such that the airfoil structure 1 bends and twists in a predefined manner in response to applied flight loads. In this particular example the stiffness properties of the load-carrying member 10 are selected such that the airfoil structure 1 twists in a predefined manner in response to bending of the airfoil structure. More particularly, the stiffness properties of the example load-carrying member 10 are selected such that the leading-edge structure 11 rotates downwardly by a predetermined amount in response to an outboard end of the airfoil structure 1 moving upwardly relative to an inboard end of the airfoil structure 1 by a particular amount. This bending and twisting is represented on FIG. 1A by the block arrows.

Figure 3A:
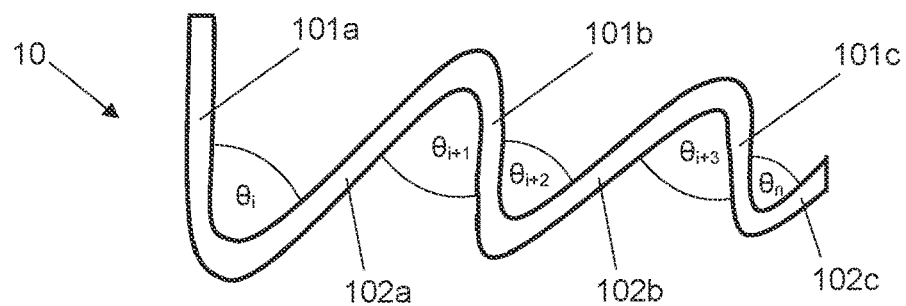
FIG. 3A is a plan view of an example load-carrying member for an airfoil structure according to the disclosure herein.
Figure 3B:
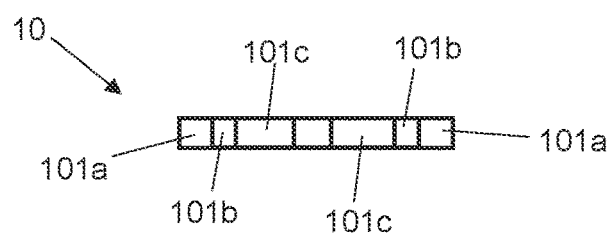
FIG. 3B is an end view of the example load-carrying member of FIG. 3A.
Figure 3C:
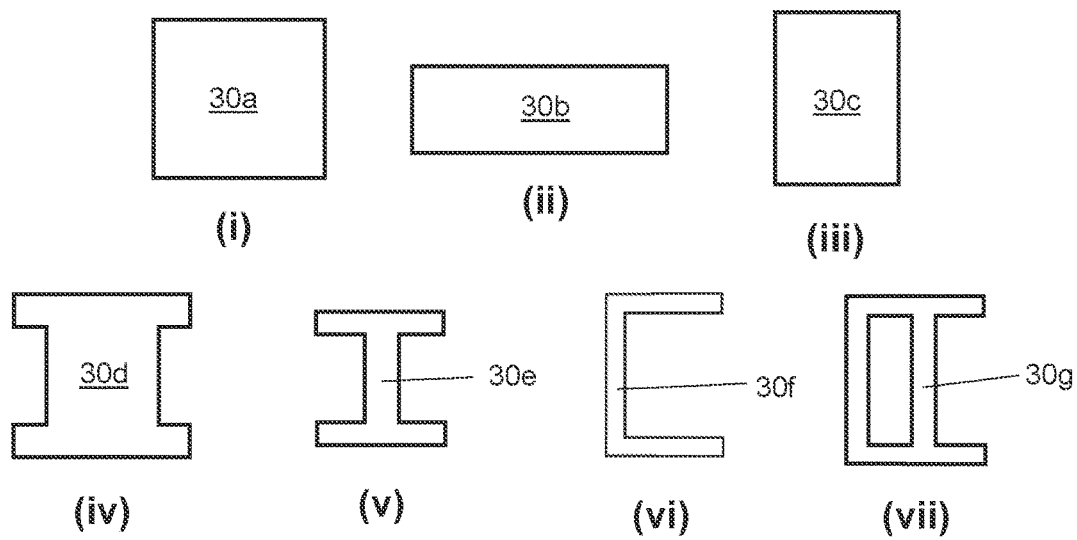
FIG. 3C shows seven different cross-sectional shapes suitable for the example load-carrying member of FIGS. 3A-3B.

FIGS. 3A-3C show an example of the load-carrying member 10 in isolation. FIG. 3A is a plan view of an upper surface of the load-carrying member 10, FIG. 3B is an end view of the load-carrying member, taken from an outboard end (that is, an end of the load-carrying member 10 which will be relatively outboard when the airfoil structure 1 is installed on an aircraft), and FIG. 3C shows a set of cross-sectional shapes suitable for the load-carrying member 10.

The design and configuration of the load-carrying member 10 is such that varying certain easily alterable parameters (hereinafter referred to as "stiffness control parameters") results in predictable changes to the stiffness properties of the load-carrying member 10. In particular, the "zig-zag" shape of the load-carrying member 10 facilitates controlled tailoring of the stiffness properties. The stiffness properties of the load-carrying member 10 are selected through the choice of particular values for the stiffness parameters of the load-carrying member 10. The chosen values are known (for example from previous experimentation) to result in particular stiffness properties. The selection of values for the stiffness parameters may be done using any suitable techniques, such as the use of look-up tables or computational models.

It can be seen from FIG. 3A that the load-carrying member 10 comprises alternating first sections 101a-c and second sections 102a-c. In general, in load-carrying members according to the disclosure herein the first and second sections are arranged such that there is an angle of between 35° and 145° between each adjacent first section and second section, resulting in a zig-zag configuration of the load-carrying member. In other example load-carrying members according to the disclosure herein the number of first and second sections, and therefore the number of "zig-zags", may differ from what is shown in FIG. 3A. In some examples the first sections 101a-c and the second sections 102a-c lie within a common surface. This is the case for the example load-carrying member 10, as can be seen from FIG. 3B. The common surface may be planar, or it may be curved around one or more axes. In examples in which the common surface is curved, the radius of curvature will typically be large. The common surface may be substantially parallel to a plane (or surface) defined by the chord and the span of the airfoil structure 1.

The particular illustrated example load-carrying member 10 comprises three first sections 101a-c and three second sections 102a-c. In this example the first sections 101a-c are substantially parallel to each other, and to a chordwise direction of the airfoil structure. However, in other examples the first sections 101a-c need not be parallel to each other, and one or more of the first sections 101a-c need not be parallel to the chordwise direction. Similarly, in the particular example the second sections 102a-c are substantially parallel to each other, but this need not be the case in other examples. It will be appreciated that, although none of the individual first or second sections of the load-carrying member 10 extends directly in the spanwise direction of the airfoil structure 1, the arrangement of the first and second sections results in a structure which overall extends in the spanwise direction.

In the example of FIGS. 3A-3C, there is a first angle $\theta_1$ between the first section 101a and the second section 102a, there is a second angle $\theta_2$ between the second section 102a and the first section 101b, there is a third angle $\theta_3$ between the first section 101b and the second section 102b, there is a fourth angle $\theta_4$ between the second section 102b and the first section 101c, and there is a fifth angle $\theta_5$ between the first section 101c and the second section 102c. In examples in which the load-carrying member 10 has more or fewer zig-zags than in the illustrated example, it will have $\theta_i$ angles, where i is between 1 and n and the number n of angles will be more or fewer than five. In principle, each of the angles $\theta_i$ may take any value in the range 35°-145°, within the constraints imposed by the desired size and shape of the airfoil structure 1, the desired number of first and second sections 101a-c, 102a-c, and the desired lengths of each of the first and second sections 101a-c, 102a-c.

In the illustrated example the lengths of the first sections 101a-c and the second sections 102a-c become progressively shorter from the inboard end of the load-carrying member 10 to the outboard end of the load-carrying member 10. In this example each first section 101a-c is longer than the immediately adjacent second sections 102a-c. In general, the lengths of each of the first sections 101a-c and the lengths of each of the second sections 102a-c may take any values, within the constraints imposed by the desired size and shape of the airfoil structure 1.

It may generally be the case that the angles $\theta_i$ are set to produce the selected stiffness properties, and the lengths of each of the first and second sections 101a-c, 102a-c are set in dependence on the selected angle values such that the overall envelope of the load-carrying member 10 matches a desired shape and size of the airfoil structure 1. The envelope of the load-carrying member 10 is considered to match the size and shape of the airfoil structure 1 when the total spanwise length of the load-carrying member is substantially equal to the total spanwise length of the airfoil structure, and when each corner between a first section 101a-c and an adjacent second section 102a-c abuts either the web part of the leading-edge structure 11 or the web part of the trailing-edge structure 12 when the load-carrying member 10 is assembled into the airfoil structure 1.

As mentioned above, the angle $\theta_i$ between each adjacent first section 101a-c and second section 102a-c may be set such as to produce the selected stiffness properties. These angles are parameters of the load-carrying member 10 which may be varied in order to vary the stiffness properties of the load-carrying member 10 and are therefore stiffness control parameters. Other stiffness control parameters of the load-carrying member 10 include parameters relating to the cross-sectional shape and size of the load-carrying member 10; and parameters relating to the material composition of the load-carrying member 10. For a given load-carrying member 10, the values of each of these stiffness control parameters will be set such as to produce stiffness properties that have been selected based on an intended use of the airfoil structure 1.

A stiffness control parameter need not be numerically expressible. For example, a value of a parameter relating to the material composition of the load-carrying member may take the form of an identifier of a particular material comprised in the load-carrying member (such as aluminum, titanium, CFRP or the like). Similarly, a value of a parameter relating to the cross-sectional shape of the load-carrying member may take the form of an identifier of a particular shape (such as square, I-shaped, H-shaped, or the like). In some examples the load-carrying member 10 is unitary and therefore its material composition is substantially the same for all parts of the load-carrying member 10. The first sections 101a-c are formed integrally with the second sections 102a-c. The load-carrying member 10 may be formed from a metallic material (such as aluminum) or a composite material (such as carbon fiber reinforced polymer (CFRP); glass fiber reinforced polymer (GFRP); or a fiber-metal laminate). Other examples are possible in which the load-carrying member is not unitary, but instead comprises multiple sub-members fixedly attached to each other.

FIG. 3C shows seven different alternative cross-sectional shapes 30a-g, each of which is suitable for the load-carrying member 10. Other cross-sectional shapes not shown may also be suitable for the load-carrying member 10. The load-carrying member cross-sectional shape 30a shown in part (i) is square. The load-carrying member cross-sectional shape 30b shown in part (ii) is rectangular with a greater width than height. The load-carrying member cross-sectional shape 30c shown in part (iii) is rectangular with a greater height than width. The load-carrying member cross-sectional shapes 30d and 30e shown in parts (iv) and (v) are each I-shaped, with the cross-sectional shape 30d having a relatively thick web part and the cross-sectional shape 30e having a relatively thin web part. The load-carrying member cross-sectional shape 30f is C-shaped. The load-carrying member cross-sectional shape 30g is C-shaped, but with an additional vertical element to increase the stiffness as compared with the cross-sectional shape 30f. Assuming all other stiffness control parameters are equal, load-carrying members having each of the cross-sectional shapes 30a-g will have different stiffness properties due to their differing cross-sectional shapes. For example, a load-carrying member having the cross-sectional shape 30d will have a greater bending stiffness than a load-carrying member having the cross-sectional shape 30a.

The values of the stiffness control parameters need not be constant along the span of the load-carrying member 10. As mentioned above, the angles $\theta_i$ between each adjacent first section 101a-c and second section 102a-c of the load-carrying member may differ. In some examples the angles may become progressively greater or smaller along the spanwise direction of the load-carrying member 10. Alternatively or additionally, one or both of the cross-sectional shape of the load-carrying member 10 and the material properties of the load-carrying member 10 may vary along the spanwise direction of the load-carrying member 10.

The values of some of the stiffness control parameters are set during manufacture of the load-carrying member and cannot easily be subsequently altered. In particular, the angles between adjacent first and second sections 101-a-c, 102a-c cannot be altered after the load-carrying member 10 has been manufactured. However; other stiffness control parameters can be altered after the load-carrying member 10 has been manufactured. For example, the values of at least some parameters relating to the cross-sectional shape of the load-carrying member 10 and at least some parameters relating to the material properties of the load-carrying member 10 can be altered after the load-carrying member has been manufactured. An example of how this can be achieved will now be explained with reference to FIGS. 4A-4B.

Figure 4A:
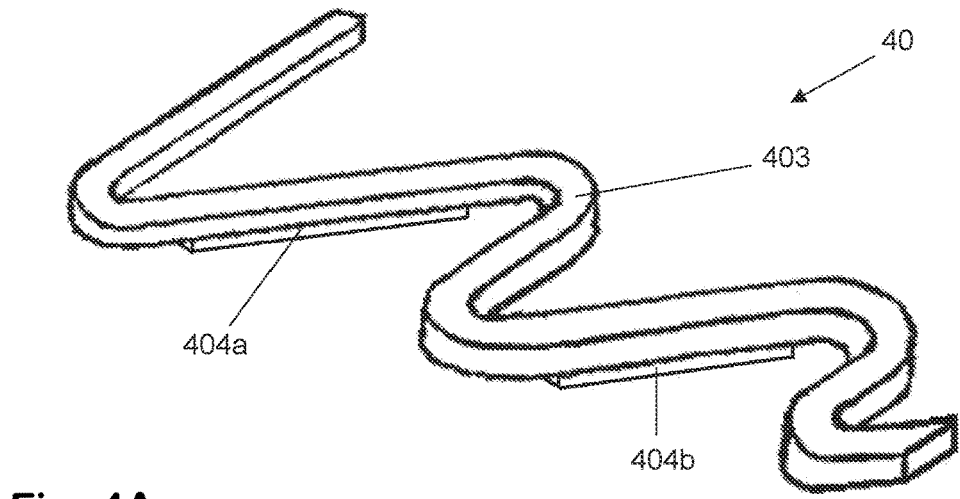
FIG. 4A is a perspective view of a second example load-carrying member for an airfoil structure according to the disclosure herein.

FIG. 4A shows an example load-carrying member 40. The load-carrying member 40 is substantially identical to the example load-carrying member 10 described above, except for the features explicitly discussed below.

The load-carrying member 40 comprises a main part 403, which is identical to the example load-carrying member 10 described above. The main part 403 has a rectangular cross-sectional shape, similar to example (ii) of FIG. 3C. The load-carrying member 40 further comprises two adjustment components 404a, 404b. Each adjustment component 404a, 404b is fixedly attached to the main part 403 at a selected location. The attachment is such that load is transmitted between the respective adjustment component 404a and the main part 403. Any suitable attachment mechanism may be used, such as one or more fasteners, a bonding agent, or the like. The fixed attachment of each adjustment component 404a, 404b to the main part 403 is such that the overall load-carrying member 40 formed by the combination of the main part 403 and the adjustment components 404a, 404b behaves under loading as if it were a single unitary component.

The addition of the adjustment components 404a, 404b means that the stiffness properties of the overall load-carrying member 40 are different to the stiffness properties of the main part 403. Each adjustment component 404a, 404b is configured to alter the stiffness properties of the main part 403 (which is in itself a load-carrying member) such that an airfoil structure in which the load-carrying member 40 is comprised bends and twists in a different predefined manner in response to applied flight loads compared to if no adjustment components were attached to the main part 403.

The configuration and material properties of each of the adjustment components 404a, 404b are selected such that fixedly attaching the adjustment components 404a, 404b to the main part 403 at the selected locations alters the stiffness properties of the main part 403 in a desired manner. Parameters of the adjustment components 404a, 404b which are selectively controlled may be the same as, or a subset of, the stiffness control parameters described above in relation to the load-carrying member 10. In particular, parameters relating to the configuration and material properties of each of the adjustment components 404a, 404b are selected in dependence on the stiffness properties of the main part 403, so as to produce certain desired stiffness properties of the overall load-carrying member 40 after the adjustment components 404a, 404b have been fixedly attached to the main part 403. For example, each adjustment component 404a, 404b may be configured to alter the cross-sectional shape of the load-carrying member 40 at the location of that adjustment component 404a, 404b, and/or may be configured to alter the material properties of the load-carrying member 40 at the location of that adjustment component 404a, 404b.

Figure 4B:
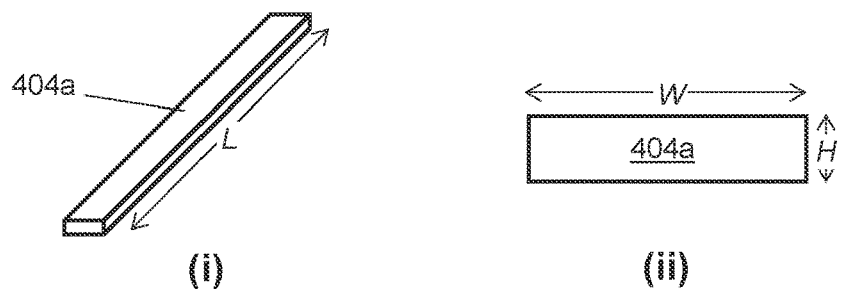
FIG. 4B shows views (i) and (ii) for an adjustment component of the example load-carrying member of FIG. 4A.

FIG. 4B shows views (i) and (ii) of one of the example adjustment components 404a in isolation. The adjustment component 404a is a strip having a rectangular cross-section. An enlarged view of the cross-section of the adjustment component 404a is shown in part (ii) of FIG. 4B. The adjustment component 404a may be formed from a metallic material (such as aluminum) or a composite material (such as carbon fiber reinforced polymer (CFRP) or glass fiber reinforced polymer (GFRP)). The adjustment component 404a may be formed from the same material as the main part 403, or it may be formed from a different material. The material of the adjustment component 404a is selected such that the adjustment component 404a has desired stiffness properties and is compatible with the material of the main part 403.

The configuration of the adjustment component 404a is selected such that the adjustment component has desired stiffness properties and may also be selected based on the location at which it is intended to attach the adjustment component 404a to the main part. For example, it may be desirable for the dimensions of the surface of the adjustment component 404a which is in contact with the main part 403 to be less than or equal to the equivalent dimensions of the surface of the main part 403 which it contacts. In the illustrated example, this means that the width W of the adjustment component 404a is less than or equal to the width of the cross-section of the main part 403, and the length L of the adjustment component 404a is less than or equal to the length of the section of the main part 403 to which the adjustment component is intended to be attached. Within these constraints, W, L and H may be varied to achieve desired stiffness properties of the adjustment component 404a (and therefore a desired adjustment to the stiffness properties of the main part 403 when the adjustment component 404a is fixedly attached to the main part 403 at a selected location).

When attached to the main part 403 at a selected location, the adjustment component 404a alters parameters relating to the cross-sectional shape of the load-carrying member 40 at that selected location. The particular illustrated example adjustment component 404a has the same cross-sectional width as the main part 403, so the cross-sectional shape of the load-carrying member remains rectangular. However; the thickness of the load-carrying member 40 in the vertical direction is greater at the location of the adjustment component 404a than at other locations on the load-carrying member 40 where no adjustment component is present. This increased thickness increases both the bending stiffness and the torsional stiffness of the part of the load-carrying member where the adjustment component 404a is present.

In this example the material properties of the adjustment component 404a are substantially identical to the material properties of the main part 403, meaning that the adjustment component 404a does not alter the material properties of the load-carrying member 40 at the selected location. However; if any parameter relating to the material properties of the adjustment component 404a were to have a different value to the value of the equivalent parameter of the main part 403, the material properties of the load-carrying member 40 would be altered at the selected location, due to the presence of the adjustment component 404a.

The same considerations apply to the adjustment component 404b. In the illustrated example the adjustment component 404b has a similar configuration to the adjustment component 404a, although this need not be the case in other examples. The material composition of the adjustment component 404b may or may not be the same as the material composition of the adjustment component 404a. In other (non-illustrated) examples the number of adjustment components may be more than two or fewer than two.

The locations of the adjustment components 404a, 404b on the main part 403 may be selected to produce desired stiffness properties of the overall load-carrying member 40, taking into account the stiffness properties and configurations of the adjustment components 404a, 404b and the stiffness properties and configurations of the main part 403. It may generally be the case that the stiffness properties and configuration of the main part 403 are known before the stiffness properties, configurations, and attachment locations of the adjustment components 404a, 404b are selected. In such cases the selection of these features of the adjustment components 404a, 404b is done in dependence on the stiffness properties and configuration of the main part 403.

Advantageously, the use of adjustment components may simplify the manufacture of the main part 403, because it becomes less important to control the airfoil shape (and the stiffness properties of the main part 403) very precisely. Any deviations from an intended airfoil shape and/or stiffness properties which arise as a result of the manufacturing process (or for any other reason) may be corrected by adding appropriately configured adjustment components. Furthermore, the adjustment components 404a, 404b may be utilised to tailor the stiffness properties of the load-bearing member 40 for a particular operational regime. As a result, a single design of main part 403, produced by a single manufacturing process, can be used as the basis for multiple differently-optimized load-carrying members 40, each having differing stiffness properties optimized for a different aircraft and/or a different operational regime.

One or both of the adjustment components 404a, 404b may not be attached to the main part 403 during an initial manufacturing process of the load-carrying member 40. Instead, one or both of the adjustment components 404a, 404b may be attached to the main part 403 after the load-carrying member 40 has begun operating as part of an airfoil structure according to the disclosure herein (for example the airfoil structure 1). This may be advantageous, for example, if it is desired to change the operational regime of an aircraft in which that airfoil structure is comprised (such as from short-haul to medium-haul). Alternatively or additionally, one or more adjustment components 404a, 404b may be removed from the main part 403 after the load-carrying member 40 has begun operating as part of an airfoil structure. One or more of the adjustment components 404a, 404b may be replaced by an adjustment component having a different configuration and/or different material properties. The in-service addition, removal and/or replacement of adjustment components can be performed in order to alter the stiffness properties of the load-carrying member 40 such that bending and twisting behavior of the airfoil structure is better suited to a new intended operational regime.

Figure 5:
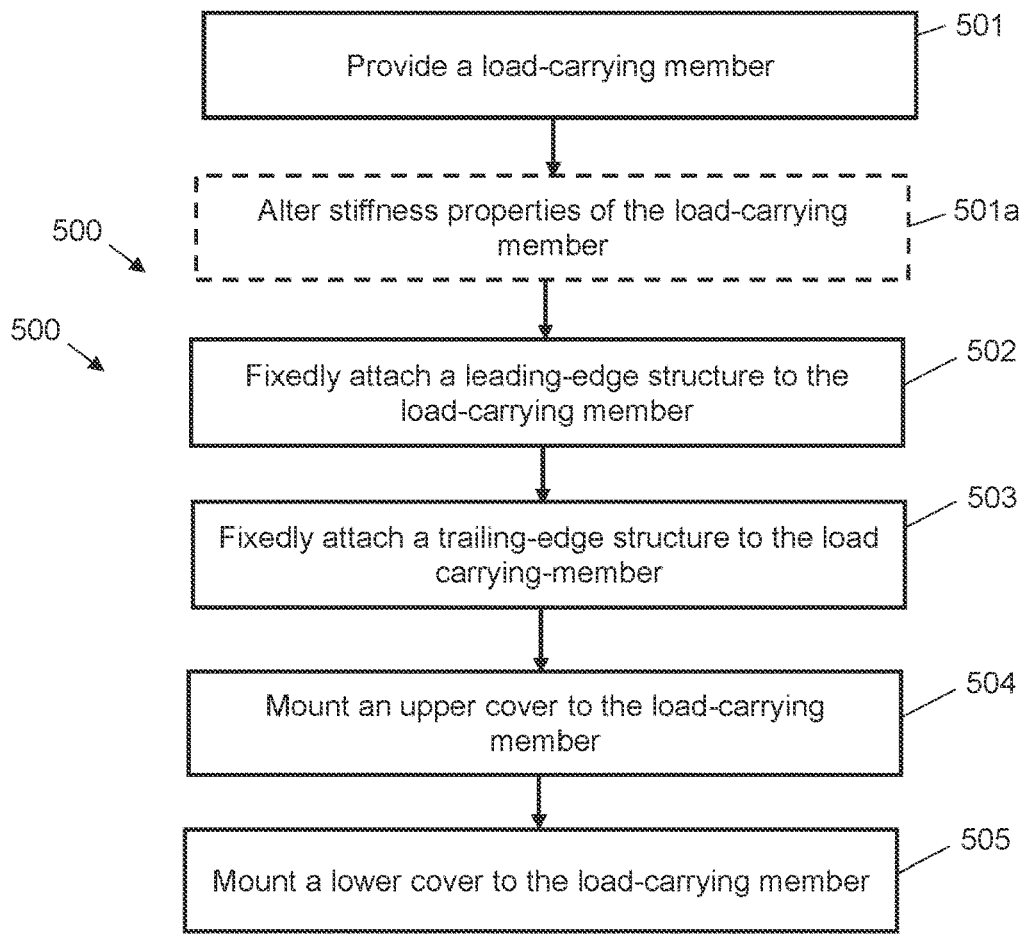
FIG. 5 is a flow chart illustrating an example method of manufacturing an aircraft airfoil structure according to the disclosure herein.

FIG. 5 is a flowchart illustrating a method 500 of manufacturing an aircraft airfoil structure which bends and twists in a predefined manner in response to applied flight loads. Performing the method 500 results in the formation of an airfoil structure according to the disclosure herein, such as the example airfoil structure 1 described above.

In a first block 501 of the method 500, a load-carrying member is provided. The load carrying-member is configured to react substantially all flight loads expected to be experienced by the resulting airfoil structure (that is, the airfoil structure that will be formed as a result of the performance of the method 500) during flight and is configured to have selected stiffness properties selected such that the resulting airfoil structure bends and twists in a predefined manner in response to applied flight loads. The load-carrying member provided in block 501 may be the example load-carrying member 10, the example main part 403, or any other load-carrying member according to the disclosure herein. Performing block 501 may comprise manufacturing the load-carrying member using any known techniques suited to the particular material from which the load-carrying member is formed. Performing block 501 may comprise arranging the load-carrying member in a particular position and orientation (e.g. using one or more jigs) selected to facilitate the performance of the subsequent blocks of the method 500. In some examples providing the load-carrying member may comprise determining stiffness properties of the load-carrying member. Such stiffness properties may be determined using any suitable known techniques.

In some examples, the method 500 further comprises an optional block 501a, which is performed after block 501. In block 501a, stiffness properties of the load-carrying member are altered in a predetermined manner by fixedly attaching an adjustment component to the load-carrying member at a selected location on the load-carrying member. In some examples, performing block 501a may comprise fixedly attaching multiple adjustment components to the load-carrying member, each at a selected location on the load-carrying member. The or each adjustment component may be substantially the same as the example adjustment component 404a described above. The or each adjustment component may be attached to the load-carrying member in the manner described above in relation to FIGS. 4A-4B.

Performing block 501a may comprise selecting configuration and material properties for the (or each) adjustment component. The configuration and material properties for the (or each) adjustment component, as well as a selected location for the (or each) adjustment component, may be selected based on determined stiffness properties of the load-carrying member. In particular, the configuration and material properties for the (or each) adjustment component, as well as a selected location for the (or each) adjustment component, may be selected based on a difference between determined stiffness properties of the load-carrying member and desired stiffness properties of the load-carrying member. Such desired stiffness properties are based on the predetermined bending and twisting behavior which the resulting airfoil structure is intended to display.

In block 502, a leading-edge structure is fixedly attached to the load-carrying member. The leading-edge structure is configured to form a leading-edge part of an aerodynamic surface of the resulting airfoil structure. The leading-edge structure may be the example leading-edge structure 11, or any other leading-edge structure according to the disclosure herein. The leading-edge structure may be attached to the load-carrying member in the manner described above in relation to the example airfoil structure 1 of FIGS. 1A-1B.

In block 503, a trailing-edge structure is fixedly attached to the load-carrying member. The trailing-edge structure is configured to form a trailing edge part of an aerodynamic surface of the resulting airfoil structure. The trailing-edge structure may be the example trailing-edge structure 12, or any other trailing-edge structure according to the disclosure herein. The trailing-edge structure may be attached to the load-carrying member in the manner described above in relation to the example airfoil structure 1 of FIGS. 1A-1B.

In block 504, an upper cover is mounted to the load-carrying member. The upper cover is configured to form an upper part of the aerodynamic surface of the resulting airfoil structure. The upper cover may be the example upper cover 13, or any other upper cover according to the disclosure herein. The upper cover may be attached to the load-carrying member in the manner described above in relation to the example airfoil structure 1 of FIGS. 1A-1B.

In block 505, a lower cover is mounted to the load-carrying member. The lower cover is configured to form a lower part of the aerodynamic surface of the resulting airfoil structure. The lower cover may be the example lower cover 14, or any other lower cover according to the disclosure herein. In some examples performing block 505 comprises removably mounting the lower cover to the load-carrying member. The lower cover may be attached to the load-carrying member in the manner described above in relation to the example airfoil structure 1 of FIGS. 1A-1B. The completion of block 505 results in an airfoil structure according to the disclosure herein.

Figure 6:
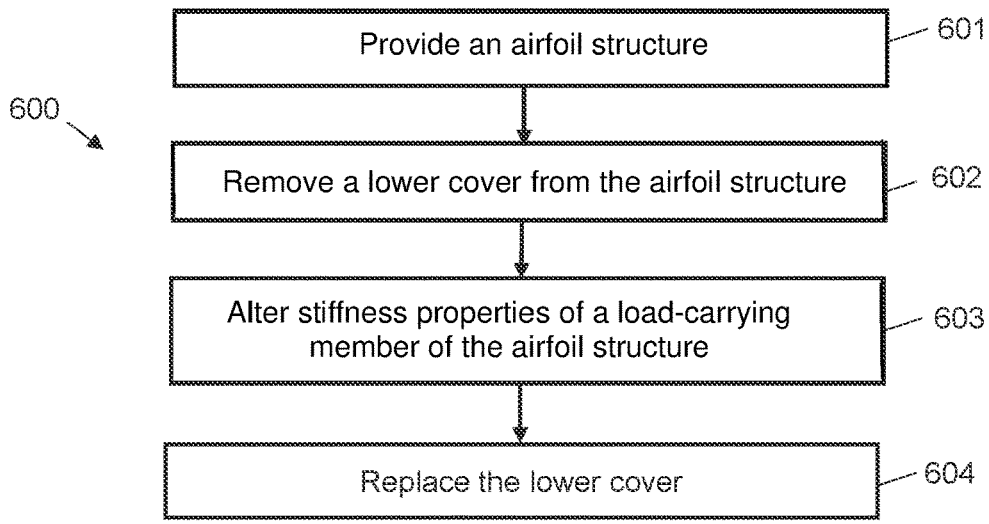
FIG. 6 is a flow chart illustrating an example method of adjusting the bending and twisting behavior of an aircraft airfoil structure according to the disclosure herein.

FIG. 6 is a flowchart illustrating a method 600 of adjusting an aircraft airfoil structure such that it bends and twists differently in response to applied flight loads. Performing the method 600 results in an airfoil structure according to the disclosure herein, which is optimized for a particular operational regime.

In a first block 601 of the method 600, an airfoil structure according to the disclosure herein is provided. The airfoil structure may be the example airfoil structure 1, or any other airfoil structure according to the disclosure herein. The airfoil structure is configured such that it bends and twists in a first predefined manner in response to applied flight loads. The airfoil structure may be provided as part of an aircraft. A lower cover of the airfoil structure is removably mounted to a load-carrying member of the airfoil structure. Stiffness properties of the load-carrying member at the time of performing block 601 are known.

In a second block 602, the lower cover of the airfoil structure is removed from the airfoil structure. Block 602 may be performed in any manner suitable to the nature of the attachment of the lower cover to the load-carrying member. For example, if the lower cover is mounted to the load-carrying member by one or more fasteners, performing block 602 comprises removing the one or more fasteners. Preferably block 602 is performed such that the lower cover and the load-carrying member are in an operational condition following the performance of block 602.

In a third block 603, stiffness properties of the load-carrying member are altered in a predetermined manner. In some examples performing block 603 comprises fixedly attaching an adjustment component to the load-carrying member at a selected location on the load-carrying member. The configuration and material properties of the adjustment component are selected, together with the location, to produce the predetermined alteration to the stiffness properties. In some examples performing block 603 comprises creating an adjustment component having a selected configuration and material properties. In some examples, performing block 603 comprises fixedly attaching multiple adjustment components to the load-carrying member, each at a selected location on the load-carrying member. In particular, the configuration and material properties for the (or each) adjustment component, as well as a selected location for the (or each) adjustment component, may be selected based on a difference between the known stiffness properties of the load-carrying member and desired adjusted stiffness properties of the load-carrying member. Such desired adjusted stiffness properties are based on desired bending and twisting behavior which the resulting airfoil structure (that is the airfoil structure which results from the performance of the method 600) is intended to display. The or each adjustment component may have substantially the same features as the example adjustment component 404a described above. The or each adjustment component may be attached to the load-carrying member in the manner described above in relation to FIGS. 4A-4B.

In some examples performing block 603 comprises removing one or more adjustment components from the load-carrying member. In some examples performing block 603 comprises replacing a given adjustment component which is fixedly attached to the load-carrying member with a different adjustment component having a different configuration and/or different material properties. Performing block 603 may comprise selecting a particular combination of adding, removing and/or replacing adjustment components, which both achieves the desired alteration to the stiffness properties and achieves one or more further goals, such as minimising the weight of the load-carrying member or simplifying the performance of the method 600.

The stiffness properties are altered so as to achieve resulting stiffness properties (the desired stiffness properties mentioned above) which cause the airfoil structure to bend and twist in a second predefined manner in response to applied flight loads. The second predefined manner is different to the first predefined manner. The second predefined manner may be better suited to a different operational regime than the first predefined manner. The method 600 may therefore advantageously be performed when it is desired to operate the aircraft in which the provided airfoil structure is comprised under an operational regime significantly different to an operational regime under which the aircraft was being operated prior to performing the method 600.

In block 604, the lower cover is replaced. Performing block 604 comprises mounting the lower cover on the load-carrying member. Block 604 may be performed in any suitable manner, depending on the particular mounting mechanism to be used. The mounting mechanism may generally be (but need not be) the same type of mechanism that was in use to mount the lower cover to the load-carrying member at the time the airfoil structure was provided in block 601. Performing block 604 may comprise removably mounting the lower cover to the load-carrying member. Block 604 may be performed in substantially the same manner as block 505 of the method 500.

Figure 7:
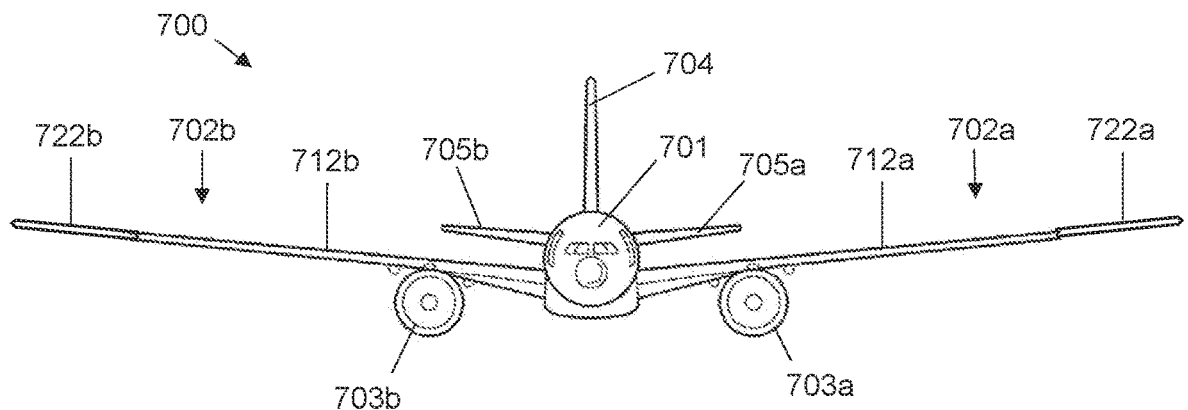
FIG. 7 is a front view of an example aircraft comprising an airfoil structure according to the disclosure herein.

FIG. 7 shows an example aircraft 700 comprising an airfoil structure according to the disclosure herein. The aircraft 700 comprises a fuselage 701 and a pair of wings 702a, 702b. Engines 703a, 703b are mounted on the wings 702a, 702b. The aircraft 700 also comprises a vertical stabilizer 704 and a pair of horizontal stabilizers 705a, 705b. The illustrated example aircraft 700 is a commercial airliner, although it should be appreciated that airfoil structures according to the disclosure herein may also beneficially be used on other types of aircraft. In the illustrated example, each wing comprises an airfoil structure according to the disclosure herein. However; it is also possible for the horizontal stabilizers 705a, 705b, and/or the vertical stabilizer 704 to comprise airfoil structures according to the disclosure herein.

The wings 702a, 702b are high aspect ratio wings, meaning that the ratio of the span to the mean chord is significantly higher than is typical for the wing of a passenger aircraft. High aspect ratio wings can lead to significant fuel savings due to the reduction in induced drag. Each wing 702a, 702b comprises an inboard part 712a, 712b, and an outboard part 722a, 722b, which includes the wing tip. The outboard part 722a, 722b of each wing comprises an airfoil structure according to the disclosure herein. In each outboard part 722a, 722b, the airfoil structure according to the disclosure herein extends for substantially the entire span of that outboard part and reacts substantially all of the flight loads experienced by that outboard part. The stiffness properties of the load-carrying members of the airfoil structures are selected in dependence on factors relating to the intended operation of the aircraft 700. Such factors may include, for example, the operating regime of the aircraft, the proportion of each flight cycle made up by a cruise phase, the routes operated by the aircraft, or any other factor which may affect the flight conditions experienced by the aircraft.

In some examples (not illustrated) a wing tip device such as a fence, winglet or sharklet may be attached to the outboard end of each airfoil structure, using any suitable known attachment techniques.

The inboard end of each airfoil structure is attached to an outboard end of the inboard part of the wing using any suitable known attachment techniques. The inboard end of each airfoil structure may be terminated by a structural fitting, or similar component, which is fixedly attached to an inboard end of the load-carrying member of the airfoil structure. Such a rib or similar component may comprise mounting features to facilitate the attachment of the airfoil structure to the inboard part 712a, 712b. In some examples, the inboard end of each airfoil structure is fixedly attached to the corresponding inboard part 712a, 712b. In other examples the outboard part 722a, 722b of each wing is configured to move relative to the corresponding inboard part 712a, 712b. For example, the airfoil structures according to the disclosure herein may each be comprised in a moveable part of a folding aircraft wing. One such example, in which the outboard part of the wing is configured to fold upwardly relative to the corresponding inboard part, is illustrated in FIGS. 8A and 8B.

Figure 8A:
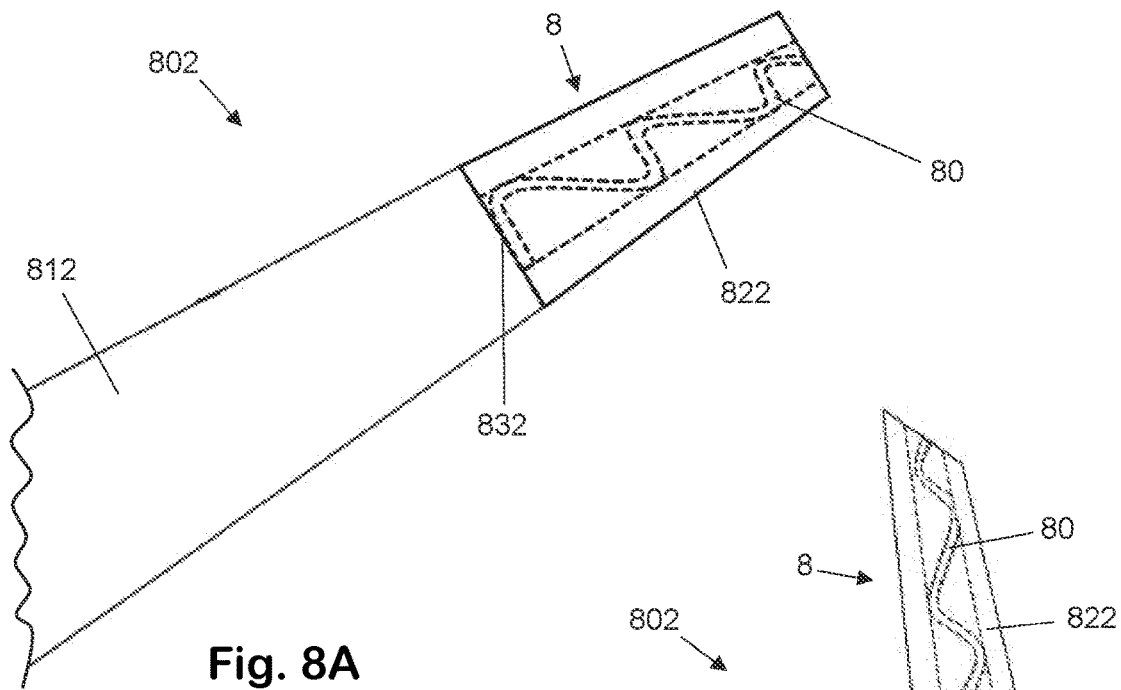
FIGS. 8a and 8B show an example aircraft wing comprising an airfoil structure according to the disclosure herein.
Figure 8B:
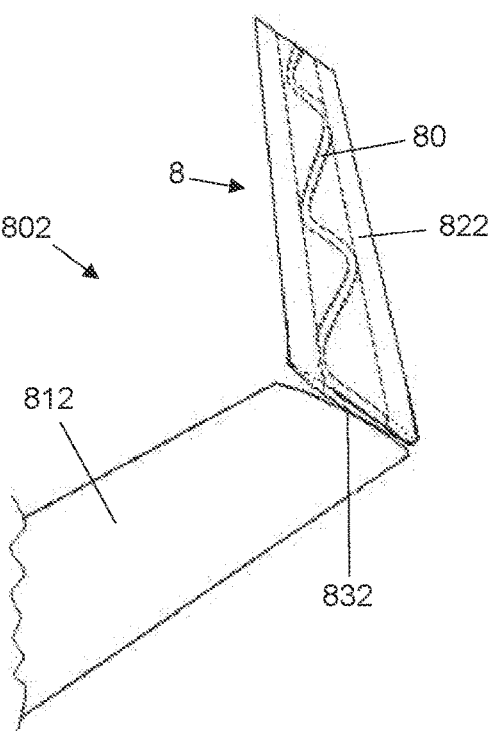

FIG. 8A is a plan view of an example folding aircraft wing 802 in an unfolded "flight" configuration, and FIG. 8B shows the same wing 802 in a folded "ground" configuration. The wing 802 comprises a fixed inboard part 812, which extends from a wing root to a tip. A moveable outboard part 822 is connected to the tip of the fixed inboard part 812 by a hinge joint 832 of any suitable design. The outboard part 822 is moveable from the flight configuration of FIG. 8A to the ground configuration of FIG. 8B. In the ground configuration, the span of the wing 802 is reduced relative to the flight configuration. This enables an aircraft in which the wing 802 is comprised to have a relatively large span during flight, whilst still complying with airport gate limits, safe taxiway usage etc., when on the ground.

The outboard part 822 of the wing 802 comprises an airfoil structure 8 according to the disclosure herein. The airfoil structure 8 comprises a load-carrying member 80. The airfoil structure 8 is substantially the same as the example airfoil structure 1 described above, and the load-carrying member 80 is substantially the same as the example load-carrying member 10 described above. The inboard part 812 of the wing 802 may also comprise an airfoil structure according to the disclosure herein. Alternatively, the inboard part 812 may have a conventional semi-monocoque construction.

Although the disclosure herein has been described above with reference to one or more preferred examples or embodiments, it will be appreciated that various changes or modifications may be made without departing from the scope of the disclosure herein as defined in the appended claims.

Although the disclosure herein has been described above mainly in the context of a fixed-wing aircraft application, it may also be advantageously applied to various other applications, including but not limited to applications on vehicles such as helicopters, drones, trains, automobiles and spacecraft, or on wind-turbines.

Where the term "or" has been used in the preceding description, this term should be understood to mean "and/or", except where explicitly stated otherwise.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An airfoil structure for an aircraft, the airfoil structure comprising:
    a spanwise-extending load-carrying member comprising alternating first sections and second sections, wherein one or more of the first sections is arranged substantially parallel to a chordwise direction of the airfoil structure, wherein one or more of the second sections is arranged between a forward corner region with one of the first sections and a rearward corner region with an adjacent one of the first sections, wherein the load-carrying member is configured to have selected stiffness properties such that the airfoil structure bends and twists in a predefined manner in response to applied flight loads;
    a leading-edge structure configured to form a leading-edge part of an aerodynamic surface of the airfoil structure, fixedly mounted to the load-carrying member;
    a trailing-edge structure configured to form a trailing edge part of the aerodynamic surface, fixedly mounted to the load-carrying member;
    an upper cover configured to form an upper part of the aerodynamic surface, mounted to the load-carrying member; and
    a lower cover configured to form a lower part of the aerodynamic surface, mounted to the load-carrying member.

2. The airfoil structure according to claim 1, wherein the load-carrying member is unitary.

3. The airfoil structure according to claim 1, wherein the stiffness properties of the load-carrying member are such that the leading-edge of the airfoil structure is configured to move downwardly by a predetermined amount in response to an outboard end of the airfoil structure moving upwardly relative to an inboard end of the airfoil structure by a particular amount.

4. The airfoil structure according to claim 1, wherein one or both of the leading-edge structure and the trailing-edge structure is modular.

5. The airfoil structure according to claim 1, wherein at least one parameter relating to a cross-sectional shape of the load-carrying member varies along a span of the load-carrying member, and/or at least one parameter relating to material properties of the load-carrying member varies along the span of the load-carrying member.

6. The airfoil structure according to claim 1, wherein an adjustment component is fixedly attached to the load-carrying member at a selected location, wherein the adjustment component is configured to alter the stiffness properties of the load-carrying member such that the airfoil structure bends and twists in a different predefined manner in response to applied flight loads compared to if no adjustment components were attached to the load-carrying member.

7. The airfoil structure according to claim 6, wherein the adjustment component is configured to alter a cross-sectional shape of the load-carrying member at the selected location, and/or is configured to alter material properties of the load-carrying member at the selected location.

8. The airfoil structure according to claim 1, wherein the stiffness properties of the load-carrying member depend on factors relating to an intended operation of an aircraft in which the airfoil structure is intended to be comprised.

9. The airfoil structure according to claim 1, wherein the lower cover is removably mounted to the load-carrying member.

10. The airfoil structure according to claim 1, wherein the airfoil structure comprises an outboard part of a high aspect ratio aircraft wing.

11. The airfoil structure according to claim 1, wherein the airfoil structure is comprised in a moveable part of a folding aircraft wing.

12. An aircraft comprising an airfoil structure according to claim 1.

13. A method of manufacturing an aircraft airfoil structure which bends and twists in a predefined manner in response to applied flight loads, the method comprising:
providing a load-carrying member comprising alternating first sections and second sections, wherein one or more of the first sections is arranged substantially parallel to a chordwise direction of the airfoil structure, wherein one or more of the second sections is arranged between a forward corner region with one of the first sections and a rearward corner region with an adjacent one of the first sections, wherein the load-carrying member is configured to have selected stiffness properties selected such that the resulting airfoil structure bends and twists in a predefined manner in response to applied flight loads;
fixedly attaching a leading-edge structure configured to form a leading-edge part of an aerodynamic surface of the airfoil structure to the load-carrying member;
fixedly attaching a trailing-edge structure configured to form a trailing edge part of the aerodynamic surface to the load-carrying member;
mounting an upper cover configured to form an upper part of the aerodynamic surface to the load-carrying member; and
mounting a lower cover configured to form a lower part of the aerodynamic surface to the load-carrying member.

14. The method according to claim 13, further comprising altering the stiffness properties of the load-carrying member in a predetermined manner by fixedly attaching an adjustment component to the load-carrying member at a selected location on the load-carrying member.

15. The method according to claim 13, comprising forming of an airfoil structure that comprises:
a spanwise-extending load-carrying member comprising alternating first sections and second sections, wherein one or more of the first sections is arranged substantially parallel to a chordwise direction of the airfoil structure, wherein one or more of the second sections is arranged between a forward corner region with one of the first sections and a rearward corner region with an adjacent one of the first sections, wherein the load-carrying member is configured to have selected stiffness properties such that the airfoil structure bends and twists in a predefined manner in response to applied flight loads;
a leading-edge structure configured to form a leading-edge part of an aerodynamic surface of the airfoil structure, fixedly mounted to the load-carrying member;
a trailing-edge structure configured to form a trailing edge part of the aerodynamic surface, fixedly mounted to the load-carrying member;
an upper cover configured to form an upper part of the aerodynamic surface, mounted to the load-carrying member; and
a lower cover configured to form a lower part of the aerodynamic surface, mounted to the load-carrying member.

16. A method of adjusting bending and twisting behavior of an aircraft airfoil structure, the method comprising:
providing an airfoil structure comprising:
a spanwise-extending load-carrying member comprising alternating first sections and second sections, wherein one or more of the first sections is arranged substantially parallel to a chordwise direction of the airfoil structure, wherein one or more of the second sections is arranged between a forward corner region with one of the first sections and a rearward corner region with an adjacent one of the first sections, wherein the load-carrying member is configured to have selected stiffness properties such that the airfoil structure bends and twists in a predefined manner in response to applied flight loads;
a leading-edge structure configured to form a leading-edge part of an aerodynamic surface of the airfoil structure, fixedly mounted to the load-carrying member;
a trailing-edge structure configured to form a trailing edge part of the aerodynamic surface, fixedly mounted to the load-carrying member;
an upper cover configured to form an upper part of the aerodynamic surface, mounted to the load-carrying member; and
a lower cover configured to form a lower part of the aerodynamic surface, mounted to the load-carrying member;
removing the lower cover from the airfoil structure;
altering stiffness properties of the load-carrying member in a predetermined manner; and
replacing the lower cover on the airfoil structure.

17. The method according to claim 16, wherein altering stiffness properties of the load-carrying member comprises fixedly attaching an adjustment component to the load-carrying member at a selected location.

18. The airfoil structure according to claim 1, wherein each of the first sections is arranged substantially parallel to each other and to a chordwise direction of the airfoil structure.

19. The method according to claim 13, wherein each of the first sections is arranged substantially parallel to each other and to a chordwise direction of the airfoil structure.

20. The method according to claim 16, wherein each of the first sections is arranged substantially parallel to each other and to a chordwise direction of the airfoil structure.

* * * * *